(No Model.)
H. H. WEMPE.
APPARATUS FOR WATERING SWINE.
No. 316,319. Patented Apr. 21, 1885.
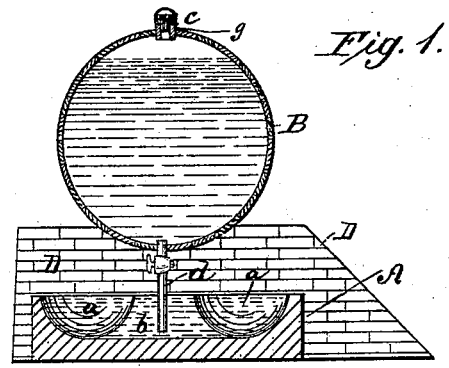
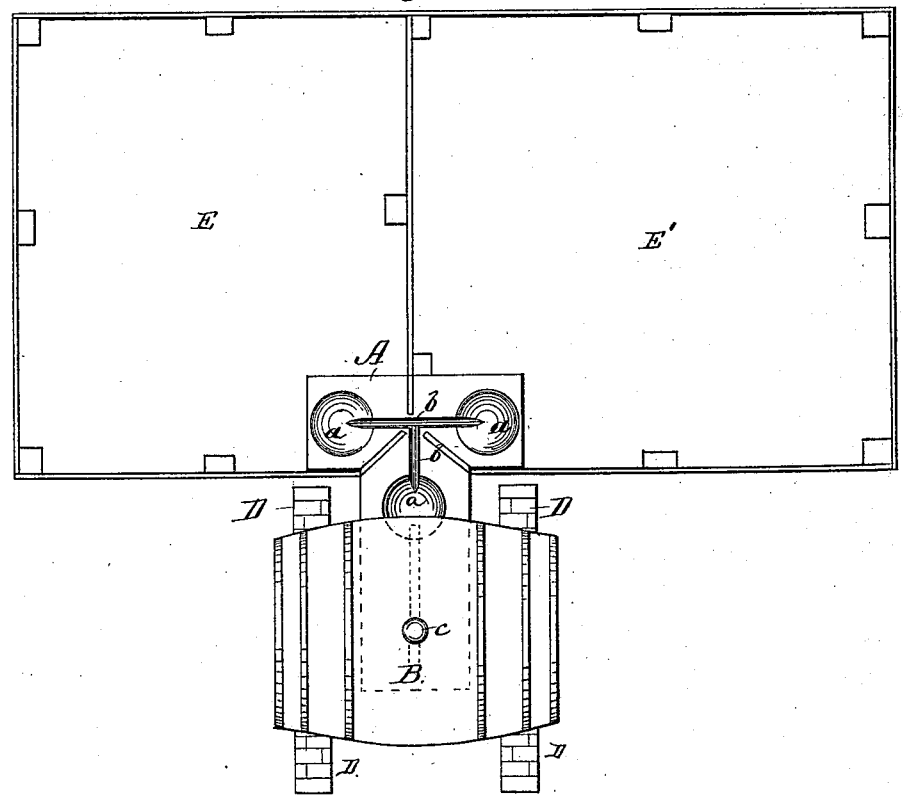
WITNESSES:
W. W. Hollingsworth
Amos W. Hart
INVENTOR:
H. H. Wempe
BY Munn & Co.
ATTORNEYS.

UNITED STATES PATENT OFFICE.

HERMANN HENRY WEMPE, OF CAPIOMA, KANSAS.

APPARATUS FOR WATERING SWINE.

SPECIFICATION forming part of Letters Patent No. 316,319, dated April 21, 1885.

Application filed July 30, 1884. (No model.)

*To all whom it may concern:*

Be it known that I, HERMANN HENRY WEMPE, a citizen of the United States, residing at Capioma, in the county of Nemaha and State of Kansas, have invented certain new and useful Improvements in Apparatus for Watering Swine, of which the following is a description.

In the construction of apparatus for watering swine it is essential the trough shall be adapted to prevent the animals from lying down in it, and that water may be conveniently supplied at will or else automatically. My invention is an improvement in the class of apparatus embodying these features, and is embodied in the construction and combination of parts hereinafter described and claimed.

Figure 1 is a vertical section showing the tank and trough arranged in the preferred manner. Fig. 2 is a plan view showing the same parts, with a slightly modified construction of the trough and a fence arranged in connection therewith.

The trough A is preferably constructed of wood, and its distinguishing feature is the form and arrangement of the water-receptacle. The latter consists of cavities $a$ and a canal, or passage, $b$, which connects them. The said cavities $a$ are designed to be of proper size to accommodate swine in drinking, while the canal $b$ is relatively very narrow. Thus two swine may drink at once, but cannot get into the trough, nor lie down in it, as they are prone to do when conditions allow.

This construction is further advantageous in these particulars: The water flows readily from one cavity $a$ to the other through the canal $b$, and thus remains the same height in each, so that two swine drinking at the same time will have equal opportunity to obtain a due supply. The canal being open at the top, it may be readily cleaned, when required, by passing a stick or broom through it.

The reservoir or supply-tank may have different forms; but I prefer a barrel, B, as shown. Said barrel is provided with a plug, $c$, and a spigot, $d$, which are located on opposite sides. The barrel is placed on parallel horizontal supports D, preferably two low walls of brick or stone. Between these walls D, and parallel to them, is placed and secured the trough A, the arrangement being such that the barrel B may be rolled on the supports D for the purpose of bringing the spigot $c$ into the canal $b$, Fig. 1, for discharging water into the trough. It will also be noted that walls D guard and protect the trough.

In Fig. 2 the trough is made T-shaped, and provided with three cavities, $a$, which are connected by a canal, $b$, of corresponding form. Such construction adapts the trough for use in connection with the two yards or fenced-in inclosures E E', which may be used for lean and fat swine respectively. The third cavity $a$, being outside the fence, is conveniently accessible for fowls.

The plug $c$, before referred to, is adapted to fit air-tight in a short tapered tube or bushing, $g$, that is driven into the barrel B.

The discharge of water from the barrel into trough A is effected automatically, and occurs whenever the mouth of the spigot $d$ is unsealed—that is to say, when the water in the trough is drawn down far enough to allow air to enter the barrel or tank through said spigot, and thus fill the vacuum caused by the previous discharge. The discharge continues in every case until the pressure of the atmosphere without balances the weight or pressure of the water within the tank. Thus the trough A is constantly kept full without requiring any attention so long as there is a supply in the tank.

I am aware that a reservoir has been arranged directly over a trough so as to discharge into it automatically, and also that it is not new to construct a trough with that portion where the animal drinks deeper than the portion where the water is discharged into it from a reservoir placed above, and therefore I disclaim such combination and construction of parts.

What I claim is—

The combination, with the trough A, having cavities $a$ and connecting-canal $b$, made open, as specified, of the barrel B, having spigot $d$, and the parallel horizontal ways D, between which the trough is arranged and whereon the barrel is mounted and free to be rolled for effecting the discharge of its contents into the trough, as specified.

HERMANN HENRY WEMPE.

Witnesses:
  DANIEL P. DUNIGAN.
  WILLIAM WILSON.